Feb. 22, 1927.

H. E. TAYLOR 1,618,240

METHOD OF AND MACHINE FOR HOBBING GEARS

Filed March 3, 1923

Inventor;
Herbert Edgar Taylor,
By Armstrong
Atty.

Feb. 22, 1927.

H. E. TAYLOR 1,618,240

METHOD OF AND MACHINE FOR HOBBING GEARS

Filed March 3, 1923 3 Sheets-Sheet 2

Inventor:
Herbert Eagar Taylor
By [signature]
Atty.

Feb. 22, 1927.
H. E. TAYLOR
1,618,240
METHOD OF AND MACHINE FOR HOBBING GEARS
Filed March 3, 1923    3 Sheets-Sheet 3
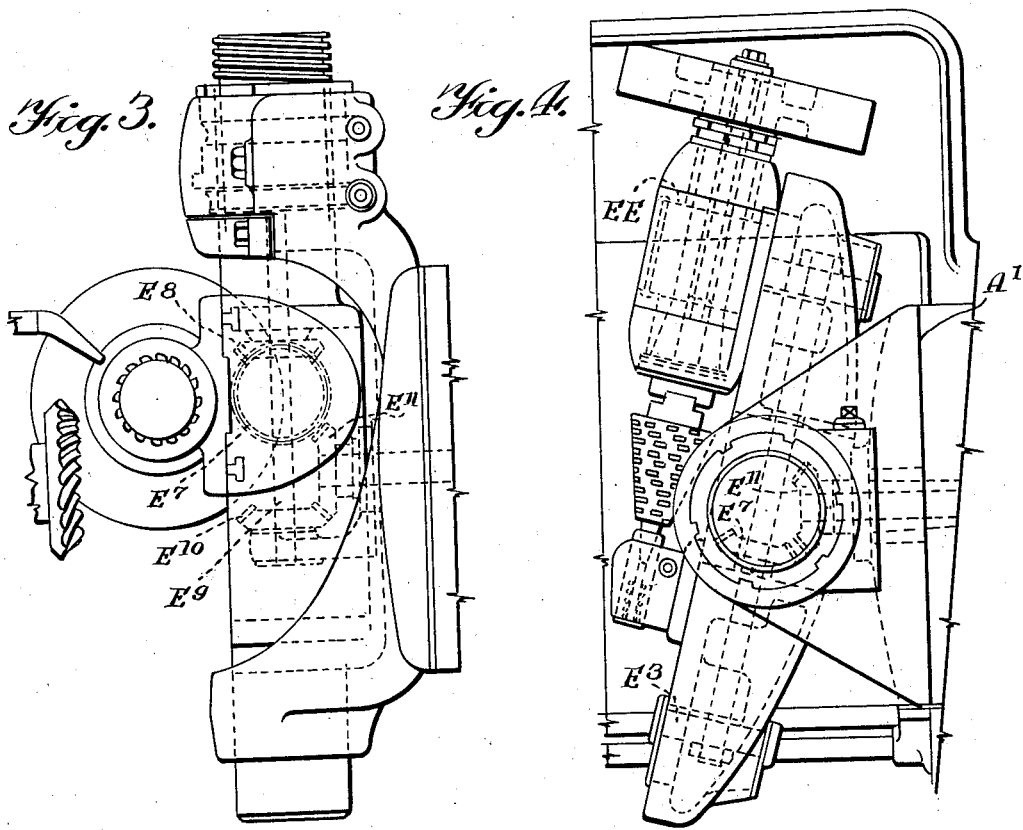
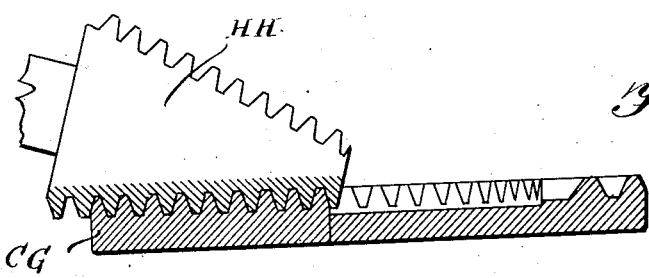
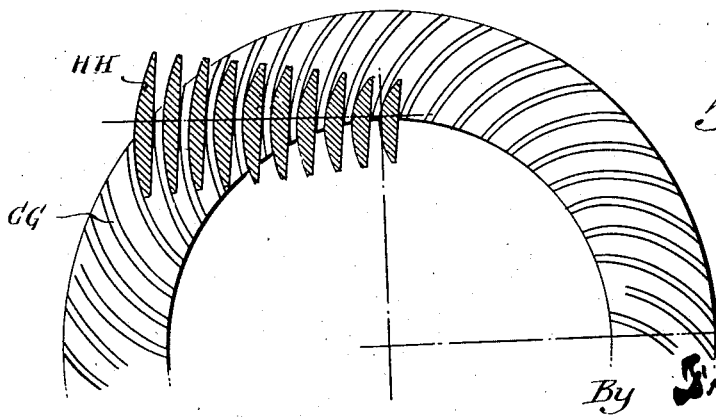
Inventor
Herbert E. Taylor
By
his Attorney Patented Feb. 22, 1927.

1,618,240

UNITED STATES PATENT OFFICE.

HERBERT EDGAR TAYLOR, OF COVENTRY, ENGLAND, ASSIGNOR TO GLEASON WORKS, OF ROCHESTER, NEW YORK, A CORPORATION OF NEW YORK.

METHOD OF AND MACHINE FOR HOBBING GEARS.

Application filed March 3, 1923, Serial No. 622,534, and in Great Britain June 2, 1922.

This invention relates to methods of and machines for hobbing bevel or other kinds of gear wheels, and particularly those which have as their basis a crown wheel in which the normal cross sections of the teeth and also of the tooth-space are uniform from end to end of the tooth, the latter for this reason extending along the basic crown body in a curve of involute form. It is the object of the invention to provide a practical and advantageous method and a machine of simple construction which is adapted accurately and economically to carry out the method for forming such teeth upon the wheel blank as will be conjugated to the teeth of this basic crown wheel.

According to this invention, the teeth of gear wheels as above specified are cut by so presenting the hob and the blank to one another and imparting relative motion to them that thereby the gear teeth are formed along curves which adapt them to mesh with the involute curved teeth upon the basic crown wheel.

It is to be observed that the longitudinal curve of the teeth so formed may differ widely from an involute curve, but notwithstanding this, the gear produced will mesh with the basic wheel. Furthermore, variations in the number of teeth (and thereby of course in the size of the blank also) cause a variation in the nature of the curve which the teeth follow, but nevertheless any two wheels which are so formed as to mesh with the basic wheel will also mesh correctly with one another.

Preferably the hob is mounted upon a head which permits of bringing its acting side into contact with the coned face of the blank so that the hob axis while crossing that of the blank is offset from the latter's centre to a definite extent, and the aforesaid head is adapted to turn bodily about an axis which extends through the apex of the pitch cone of the blank and lies in the same plane as the axis of the said cone.

In operation the hob and the blank are rotated at the appropriate relative speeds (as determined by the ratio of the unmber of "starts" in the hob to the number of teeth required in the blank, plus or minus the advance of the latter necessary to compensate for the feed by which the involute is generated), to effect the cutting, while the head is swung bodily around its axis to effect the feed by which the teeth are completed.

The invention further comprises the particular arrangement of the parts and gearing necessary to make the foregoing adjustments and to provide the appropriate driving ratios and feed motions, and the description hereunder given is to be regarded merely as an example of the manner in which the invention can be carried out, without thereby binding me to the specific details thereof.

The manner of carrying out the invention is illustrated in the accompanying drawings in which—

Figures 3 and 4 are enlarged views of gearing on the head carrying the hob for driving the latter;

Figure 5 is a sectional diagrammatic view illustrating a hob such as employed in the present machine in intermeshing relation with the basic crown gear with which the gears to be cut are adapted to coact, and Figure 6 is a sectional plan view through the teeth of the hob in a plane above the crown gear.

Figure 1:
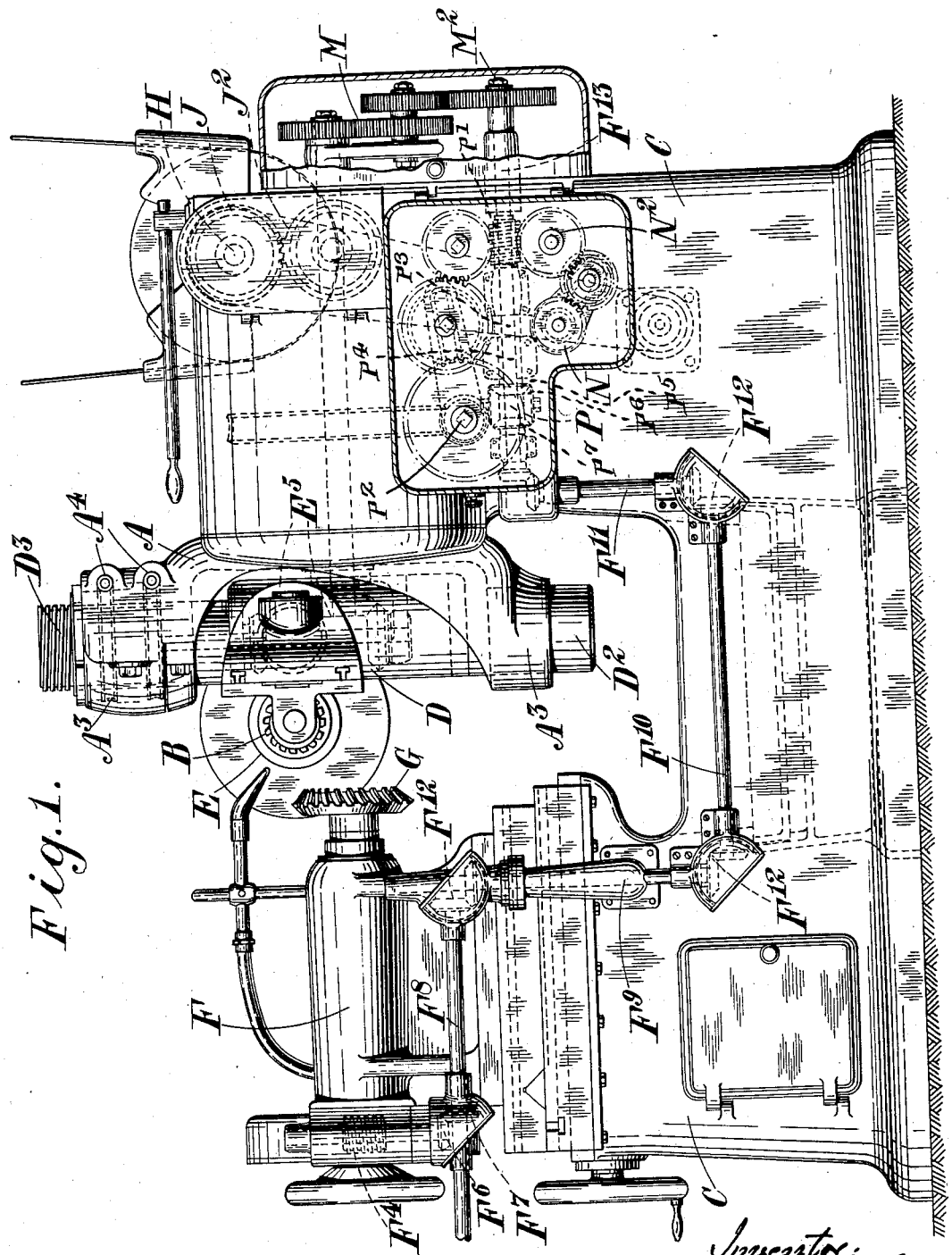
Figure 1 is a front elevation of the machine, with the part F shown for clearness with its axis in the plane of the paper.
Figure 2:
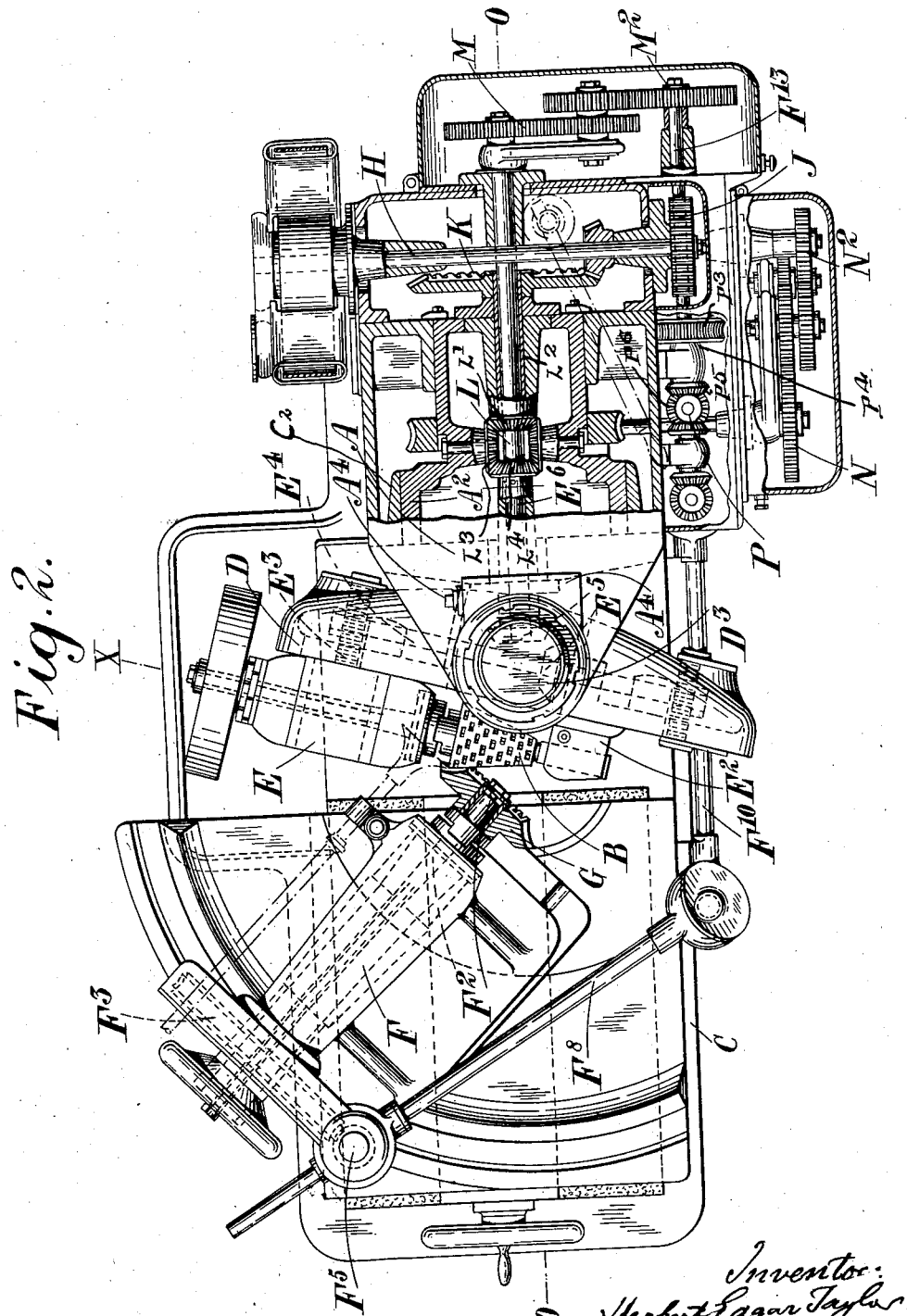
Figure 2 is a plan view partly in section showing the axis of the part F in its appropriate relationship to the axis of the head carrying the hob.

Gear wheels of the type described have the characteristic feature that the teeth and tooth spaces (measured in the pitch cone) are each of uniform width in all sections at right angles to the side surface of the tooth. From this it follows that the normal pitch is constant. Furthermore since the developed lengthwise tooth curves are involutes of a circle, the normal to side surface of the developed tooth at any point will be tangent to the base circle. It is possible, therefore, to make a constant pitch linear rack section mesh with the above mentioned gear by arranging the rack section diagonally across the face of the gear so that it lies in a plane tangent to the base circle of the developed lengthwise tooth curves, as illustrated in Figures 5 and 6 wherein the developed tooth curves are represented by the basic crown gear and the portion of the hob lying in the sectional plan in Figure 5 may be taken as the rack section. Now if the crown gear wheel is rotated, the rack section will be moved along in this tangent plane until it reaches the base circle of the involute longitudinal tooth curves. Considering only the rack tooth at the outside end of the rack section, it is evident that this tooth touches a gear tooth at a point on the outside of the gear wheel. As the gear wheel is rotated, with consequent movement of the rack section in the tangent plane, the point of contact of the rack tooth and gear tooth travels along the lengthwise curve of the gear tooth from the outside toward the inside until it has reached the base circle. Thus, the lengthwise involute curve of the gear wheel tooth is swept out by simply rotating the crown gear wheel in mesh with the linear rack section.

If the linear rack section is replaced with a hob having the same pitch and pressure angle as the rack, and the hob rotated in mesh with the crown gear wheel, the points of contact between the hob and gear teeth will travel along, as for the rack section, sweeping out the lengthwise involute curve.

The actual tooth profile is produced according to the above principles and the well known method of generating bevel gear wheels in which the blank and an intermeshing cutting tool representing the mating crown gear of the blank are rolled relatively to each other about an axis containing the pitch cone apex of the blank. Preferably the cutting tool is a hob and the rack section, which it represents, corresponds to a normal section extending diagonally across the face of the imaginary mating crown wheel, as illustrated in Figures 5 and 6. To generate the tooth profile, the hob is swung around, and at a constant distance from, an axis normal to the pitch plane of the crown wheel at the pitch cone apex, and the gear wheel is rotated in proper intermeshing relation with it.

From the above description, it is apparent that the hob and blank are rotated in mesh while coincidently the hob is swung around an axis and an additional rotational movement given to the gear wheel to form the lengthwise curvature and generate the tooth profile. The two rotational movements to the gear wheel are combined into one in the machine by means of a suitable mechanism.

An important characteristic of this method of cutting gear wheels lies in the fact that, as a result of the diagonal disposition of the hob across the gear face so that it overlaps at both the outside and inside ends of the teeth, finished tooth spaces of the correct width, depth and shape along this entire length are produced by simply rotating the hob in mesh with the gear wheel and at the same time swinging the hob axis about an axis containing the pitch cone apex, as outlined above. The hob need not be displaced in the direction of its axis, nor the distance from its axis to the pitch cone apex changed during the process of cutting. It is not necessary to sink the hob deeper in mesh with the gear wheel during cutting to obtain tooth spaces of the desired depth, as is done in a well known method used in hobbing spur gears, because the generating motion causes the hob to traverse each section of the gear wheel at full depth.

The hob, which must be conjugate to the crown wheel, which mates with the gear wheel to be cut, may be of either the known cylindrical form or may be in the form of a truncated cone, the use of the latter constituting an important feature of this invention. Since the hob represents a rack section, its proportions must be such that it will not interfere with rack sections adjacent to the one which it represents. By using the truncated cone form of hob, greater clearance is provided and more latitude in the proportioning of the hob is allowed. A mechanism for accomplishing the method of cutting explained above will now be described.

Mounted to rotate about a horizontal axis $O, O$ containing the blank apex is a head $A$ which caries upon it the hob $B$. This head may comprise a face plate $A^1$ supported by a substantial shaft or equivalent $A^2$ carried by bearings $C^2$ mounted upon the machine bed $C$, the object of the head being to carry an adjustable member $D$ on which the hob is rotationally mounted so that in a mean position the axis $X, X$ of the hob is normal to the rotational axis $O, O$ of the head. Adjustments are provided for this member to enable the axis of the hob to be offset from the axis of the head to a desired extent, and also so that the axis of the hob can be inclined at any desired angle to the axis of the head. Any suitable means may be employed for this purpose, but preferably the member $D$ is in the form of a carriage intermediate of whose ends are trunnions $D^2$, $D^3$ carried by bearings $A^3$ on the head $A$ so that the axis of the trunnions intersects that of the head at right angles. The trunnions are movable endwise and angularly in their bearings $A^3$ and can also be clamped as desired by any suitable nut and clamp means indicated at $A^4$, thus serving both for the effecting and the inclining of the hob axis to the desired extent.

Upon this carriage $D$ is provided a driving headstock $E$ and a tailstock $E^2$ for the support of the hob $B$, and the latter may be rotated by providing it with an elongated spur gear $EE$ meshing with a gear $E^3$ on a parallel shaft $E^4$ upon the carriage, the shaft being so arranged that its axis intersects the trunnion axis, and by a known system of bevel gearing $E^5$ is connected to a drive-shaft $E^6$ extending centrally through the shaft or equivalent $A^2$ which supports the head A. This bevel gearing may be of the known kind comprising two pairs of bevel wheels (having splined driving connections where necessary) whose axes all meet in the trunnion axis, and so arranged that the drive can be conveyed to the hob no matter at what angle it is inclined to the head-axis, nor to what extent it is offset from the latter. Thus this gearing may comprise a gear $E^7$ on shaft $E^4$ meshing with a gear $E^8$ on a vertical shaft $E^9$ on the axis of member D. Shaft $E^9$ carries a gear $E^{10}$ which may be splined thereon and meshes with a gear $E^{11}$ on shaft $E^6$.

The hob headstock with its tailstock may be transposed end for end if the nature of the work makes this desirable.

Upon the bed C of the machine is mounted opposite to the head the "blank-supporting" member. This virtually constitutes a headstock bearing F supporting the spindle $F^2$ or other carrier for the blank G, and this headstock has the axis of its spindle in the same horizontal plane as that in which lies the axis about which the hob-carrying head is adapted to rotate (i. e. the plane of the axis O, O). Furthermore, this headstock F can be swung on a quadrant base CC about a vertical axis (that is, an axis at right angles to the axis O, O of the head), so that the "pitch cone" apex of the blank always meets the axis of the head at whatever angle the headstock may be twisted around to accord with the apex angle of the blank, the necessary arrangement being provided to ensure that these conditions are attainable. Furthermore the whole headstock and its supporting portion may be made bodily adjustable to and from the hob, by the adjustment of the base CC on ways FF.

The machine is provided with a main drive-shaft H which conveys the drive to the shaft or equivalent $A^2$ for the head A, preferably through worm or worm-wheel mechanism.

The hob B is driven through change speed gears J, $J^2$, bevel gears K and differential gears L. The latter compensate for the differential action of gears $E^5$ when the head A revolves about its axis and comprise a gear $L^1$ fixed on a sleeve $L^2$ rotating on shaft $E^6$ and carrying gear K. Meshing with gear $L^1$ are gears $L^3$ rotatably carried on shaft $A^2$ and meshing with a gear $L^4$ fixed on shaft $E^6$ which is continuous from $E^{11}$ to gears M—$M^2$. The latter constitute a further set of change speed gears M, $M^2$ connecting the shaft $E^6$, previously mentioned, with the blank-carrying shaft $F^2$.

As the connection to the latter is complicated by the angular positions which it occupies relative to the other parts of the mechanism, the driving train preferably comprises a worm-wheel $F^3$ on the blank shaft $F^2$ and a worm $F^4$ on a vertical shaft $F^5$ engaging it and driven through bevel wheels $F^6$, $F^7$ by a horizontal shaft $F^8$ connecting by suitably arranged shafts $F^9$, $F^{10}$ and $F^{11}$ and gearing $F^{12}$ uniting them, a feed-shaft $F^{13}$ parallel with the head-shaft and driven by the previously mentioned change-speed gears M, $M^2$ from the central hob-driving shaft. As the shaft $F^8$ must necessarily be displaced angularly when making an adjustment of the blank-carrying headstock, the manner of its connection with the aforesaid feed-shaft as above described, makes full provision for its movements, and in addition it has a splined connection with the gear $F^7$ to allow for changes in its effective length when displaced.

To compensate for the rotational (i. e. the angular) movement of the head carrying the hob, additional change speed gearing N, $N^2$ is provided to produce the desired modification in the driving ratios and for this purpose it is preferred to employ gearing of a planetary form, which may be constituted by bevel gears P arranged in the known manner, such that the differential driving of one element is adapted to increase or to reduce the speed of the driven element. Thus shaft $F^{13}$ drives a worm $P^1$ which through change speed gears as shown in Figure 1 drives a shaft $P^2$. The latter through a worm and worm wheel swings the shaft $A^2$. Worm $P^1$ drives also, through change gears N–$N^2$ a worm wheel $P^3$ on a sleeve $P^4$ rotating on shaft $F^3$ and carrying a bevel gear $P^5$. The latter meshes with gears $P^6$ rotating on a differential spider fixed on shaft $F^{13}$ which ends at the spider. Gears $P^6$ drive a gear $P^7$ which drives shaft $F^{11}$ through the means described.

The hob B may be either parallel cylindrical form, such as a gashed tangent rack spur gear (i. e. a spur gear on the known tangent rack system, suitably gashed to form cutting teeth, or in the form of a truncated cone as shown in the drawings, use of the latter constituting an important feature of the invention. Alternatively it may be a cylindrical hob of the known kind, but in each case the hob must be conjugated to or, in other words, to mesh correctly with the imaginary crown gear forming the basis of the system.

In setting up the work the blank G is arranged so that the apex of its pitch cone is on the axial line O, O of the head, and the slant side of the cone upon which the hob engages is at right angles to the aforesaid head-axis. The hob, therefore, is set up so that, whether it is of parallel or of conical form, the side which is in action upon the blank is parallel to the aforesaid slant side of the cone (i. e. it is at right angles to the head-axis) The axis of the hob projected into the common plane tangent to the pitch cones of the blank and hob by means of the adjustments provided is offset from the axis O, O which contains the centre or apex of the blank to an extent corresponding to the radius of the circle upon the basic wheel from which the involute curves of the teeth are developed or, in other words, the projected hob axis is tangent to such base circle.

The change speed gear trains are arranged so that the appropriate rate of rotation is given to the blank in accordance with the number of "starts" in the hob and the number of teeth to be cut in the blank. The displacement of the hob-head through its feed-gears, combined with the compensated additional movement of the blank through the compensating planetary gears acts to sweep out the involute path accurately, the completion of the whole of the blank coinciding with the completion of the swing of the hob from one end of the tooth to the other.

In certain cases the teeth of gear wheels of the type referred to at the commencement of this specification, while retaining their parallelism of normal space and normal width are sometimes caused to diminish in height towards the centre of the wheel as in ordinary bevel wheels, and if it is desired to produce wheels of this kind, it can be effected by varying (i. e. diminishing progressively) the depth of the hob tooth from end to end of the hob.

If a spur gear hob is employed the only alteration necessary is the arrangement of the adjustable carriage supporting the hob in such manner that its rotational axis would then be at right angles to that of a parallel cylindrical hob, this being well understood by those skilled in the art.

In operation, with the blank and hob positioned as described, application of power to shaft H, through the change gears J—J², drives gear K and through the differential gearing L rotates shaft E⁶ to rotate the hob for cutting. Simultaneously shaft E⁶ through the change gears M—M² rotates shaft F¹³ and the worm P¹ thereon from which rotation is transmitted through the upper change gears N—N² of the hob head to slowly rotate or swing the latter to generate the teeth. The differential gearing L modifies the cutting rotation of the hob in accordance with the generating swing of the head as well understood in the art. Also worm P¹ on shaft F¹³, through the lower change gears N—N² rotates bevel gear P⁵ which, with the rotation of the gears P⁶ of the differential P gives the gear P⁷ and the blank drive a combined indexing rotation and generating roll corresponding with the actuation of the hob.

To increase the utility of the machine it may be provided with any known or suitable form of multispeed driving gear, or by employing a variable speed electro-motor, as may be preferred.

The invention comprises an effective and substantial form of machine which in a simple manner provides for all the necessary adjustments and feed motions requisite for the cutting of the particular form of gear wheel above set forth.

Where a machine is intended for the repetition production of one class or size of gear only, its cost of manufacture can be very considerably reduced by making the carriage D a fixture, either as to its position of angular adjustment only, or the amount of offset as well. Obviously in this case a standard hob only would be used. With such an arrangement also, the blank-carrying head, instead of being angularly adjustable as described, would have a fixed relationship with the hob-carrying head. This arrangement is particularly favourable to stiffness of the machine, reduction of first cost, and the impossibility of error in the work even with unskilled attendants.

What I claim as my invention and desire to secure by Letters Patent of the United States is:—

1. The method of hobbing curved tooth bevel gears having teeth of involute curvature longitudinally consisting in simultaneously rotating a taper hob in intermeshing relation with the blank with the projection of its axis, in the common plane tangent to the pitch cones of the blank and hob, arranged tangent to the base circle from which the longitudinal curvature of the teeth is derived, imparting a continuous indexing motion to the blank, and effecting a relative generating movement between the blank and hob to form the teeth profiles.

2. The method of hobbing curved tooth bevel gears having teeth of involute curvature longitudinally consisting in simultaneously rotating a hob of constant lead in intermeshing relation with the blank with the projection of its axis, in the common plane tangent to the pitch cones of the blank and hob, arranged tangent to the base circle from which the longitudinal curvature of the teeth is derived, imparting a continuous indexing motion to the blank, and effecting a relative generating movement between the blank and hob to form the teeth profiles.

3. The method of hobbing curved tooth bevel gears having teeth of involute curvature longitudinally consisting in simultaneously rotating a taper hob of constant lead in intermeshing relation with the blank with the projection of its axis, in the common plane tangent to the pitch cones of the blank and hob, arranged tangent to the base circle from which the longitudinal curvature of the teeth is derived, imparting a continuous indexing motion to the blank, and effecting a relative generating movement between the blank and hob to form the teeth profiles.

4. In a machine of the class described, the combination with a tool support, a worm hob mounted thereon and a blank support of means for adjusting the hob vertically and angularly relative to its support, means for rotating the blank support and means for moving the hob about two axes which extend at an angle to each other.

5. In a machine for cutting curved tooth bevel gears whose basis is a crown gear having teeth extending in involute curves from a base circle, a rotatable blank support, a tool support rotatable about an axis which lies in the same plane as the rotary axis of the support, a rotatable tool mounted on the tool support and means for adjusting the tool so that its axis is offset from the axis of the tool support an amount equal to the radius of the circle of the basic crown gear from which the lengthwise tooth curvature of the gears to be cut is derived.

6. In a machine of the class described, the combination with a tool support, a taper hob mounted thereon and a blank support, of means for adjusting the hob vertically and angularly relative to its support, means for rotating the blank support and means for moving the hob about two axes which extend at an angle to each other.

7. In a machine of the class described, the combination with a tool support, a worm hob mounted thereon, and a blank support, of means for adjusting the hob vertically and angularly relative to its support, means for rotating the blank support and means for simultaneously imparting a relative rolling movement between the hob and blank support.

8. In a machine of the class described, the combination with a tool support, a taper hob mounted thereon, and a blank support, of means for adjusting the hob vertically and angularly relative to its support, means for rotating the blank support and means for simultaneously imparting a relative rolling movement between the hob and blank support.

9. In a machine for cutting the teeth of gears whose basis is a crown gear having teeth extending in involute curves from a base circle, the combination of a rotary blank support, a head angularly movable about an axis extending through the apex of a blank carried by said support, a hob adapted to engage said blank, carried by said head and rotating about an axis that is offset from said head axis, and means for rolling said blank support and said hob relatively to one another to form teeth along curves which adapt them to mesh with the involute curved teeth of said basic crown gear, substantially as set forth.

10. In a machine of the class described, the combination of a rotary blank support, a head angularly movable about an axis extending through the apex of a blank carried by said support, a rotary hob adapted to engage said blank having its rotary axis offset from the axis of said head, a member carrying said hob mounted upon the aforesaid angularly movable head, and means for adjusting said member to vary the angular relationships of said hob axis and said head axis and also their degree of offset, substantially as set forth.

11. In a machine of the class described, the combination of a rotary blank support, a head angularly movable about an axis extending through the apex of a blank carried by said support, a rotary hob adapted to engage said blank having its rotary axis offset from the axis of said head, a member carrying said hob, trunnions upon said member, and bearings upon said angularly movable head for the reception of said trunnions, adapted to permit of their endwise and angular adjustment thereby to vary the degrees of relative inclination and offset of the axes of said hob and said head, substantially as set forth.

12. In a machine of the class described, the combination of a rotary blank support, a head angularly movable about an axis extending through the apex of a blank carried by said support, a rotary hob adapted to engage said blank having its rotary axis offset from the axis of said head, a member mounted upon said angularly movable head, a headstock and a tailstock upon said member for driving and for supporting said hob, a driving shaft extending coaxially through said angularly movable head, and a shaft upon said hob-supporting member parallel with said hob axis operatively connecting said hob-driving means with said driving shaft, substantially as set forth.

13. In a machine for cutting the teeth of gears whose basis is a crown wheel having teeth extending in involute curves from a base circle, the combination of a blank support, a head angularly movable about an axis extending through the apex of a blank carried by said support, a hob adapted to engage said blank, carried by said head and rotating about an axis that is offset from said head axis, means for rotating said blank support about an axis that is inclinable to the axis of movement of said head, and means for rolling said blank support and said hob relatively to one another to form teeth upon said blank along curves which adapt them to mesh with the involute curved teeth of said basic crown wheel, substantially as set forth.

14. In a machine of the class described, the combination of a blank support, a head angularly movable about an axis extending through the apex of a conical blank carried by said support, a hob adapted to engage said blank, carried by said head and rotatable about an axis that is offset from said head axis, means for rotating said blank support about an axis that is inclinable to said head axis, driving means for rotating said hob, comprising a shaft extending coaxially through said angularly movable head and operatively connected with said hob, means for moving said hob-carrying head angularly about its axis during rotation of said blank support and said hob, and means comprising a differential train in the driving means for said hob, adapted to compensate for the differential driving effect upon said hob during angular movement of said hob-supporting head, substantially as set forth.

15. In a machine of the class described, the combination of a blank support, a head angularly movable about an axis extending through the apex of a blank carried by said support, a hob adapted to engage said blank, carried by said head and rotating about an axis that is offset from said head axis, means for rotating said blank support about an axis that is inclinable to said head axis, driving means for rotating said hob, comprising a shaft extending coaxially through said angularly movable head and operatively connected with said hob, means for moving said hob-carrying head angularly about its axis during rotation of said blank support and said hob, means comprising a differential train in the driving mechanism for said hob, adapted to compensate for the differential driving effect upon said hob during rotation of said hob-supporting head, a change speed gear mechanism connecting said hob and said blank support, a planetary gear combined with said change speed gear, and means for differentially driving one element of said planetary gear, substantially as set forth.

16. In a machine for cutting the teeth of gears whose basis is a crown wheel having teeth extending in involute curves from a base circle, the combination of a blank support, a head angularly movable about an axis extending through the apex of a blank carried by said support, a hob in the form of a truncated cone arranged with its acting periphery at right angles to the axis of said angularly movable head in engagement with said blank, said hob being carried by said head and rotating about an axis that is offset from said head axis, and means for rolling said blank support and said hob relatively to one another to form teeth upon said blank along curves which adapt them to mesh with the involute curved teeth of said basic crown wheel, substantially as set forth.

17. In a machine of the class described, a blank support, a tool support, a tool carrier, a single means adjustable vertically and angularly for mounting said tool carrier upon said tool support, means for rotating the blank support and means for moving the tool about two axes which extend at an angle to each other.

In testimony whereof I have signed my name to this specification.

HERBERT EDGAR TAYLOR.